United States Patent [19]

Swain et al.

[11] Patent Number: 5,424,508

[45] Date of Patent: Jun. 13, 1995

[54] LASER ABLATION SYSTEM

[75] Inventors: Eugene A. Swain; Henry T. Mastalski, both of Webster, N.Y.

[73] Assignee: Xerox Corporation, Stamford, Conn.

[21] Appl. No.: 178,166

[22] Filed: Jan. 6, 1994

[51] Int. Cl.[6] .............................................. B23K 26/14
[52] U.S. Cl. ........................... 219/121.84; 219/121.68; 219/121.69; 427/555; 216/65
[58] Field of Search ................... 156/643; 219/121.19, 219/121.2, 121.24, 121.33, 121.4, 121.41, 121.67, 121.68, 121.69, 121.82, 121.84; 427/378, 554, 555, 556

[56] References Cited

U.S. PATENT DOCUMENTS

| | | | |
|---|---|---|---|
| 4,671,848 | 6/1987 | Miller et al. | 156/643 |
| 4,877,644 | 10/1989 | Wu et al. | 427/53.1 |
| 5,164,567 | 11/1992 | Gettemy | 219/121.72 |
| 5,278,386 | 1/1994 | Mansour et al. | 219/121.68 |
| 5,356,081 | 10/1994 | Sellar | 219/121.62 |

FOREIGN PATENT DOCUMENTS

| | | | |
|---|---|---|---|
| 3801068 | 7/1989 | Germany | 219/121.84 |
| 1-162583 | 6/1989 | Japan | 219/121.84 |
| 3144458 | 6/1991 | Japan . | |
| 3194131 | 2/1993 | Japan . | |

OTHER PUBLICATIONS

Lift-Off Stencil Created by Laser Ablation, IBM Technical Disclosure Bulletin, vol. 28, No. 5, Oct. 1985, p. 2.

*Primary Examiner*—Bruce A. Reynolds
*Assistant Examiner*—Gregory L. Mills

[57] ABSTRACT

A system for for removing a band of coating material from a first end of a coated cylinder having a second opposite end including ablating the band of coating material with a laser beam and directing an annular curtain of compressed fluid against the band in a direction away from the second opposite end to create an air curtain along the outer surface of the cylinder in a direction from the second opposite end toward the band and the first end.

20 Claims, 8 Drawing Sheets

LASER ABLATION SYSTEM

BACKGROUND OF THE INVENTION

The invention relates to processes and apparatus for removing coatings, and particularly to a process and apparatus for removing at least part of a coating from a predetermined portion of a photoreceptor.

In electrophotography, and particularly in xerographic copying machines, coated substrates such as photoreceptor belts or cylindrical photoreceptor drums are common. Photoreceptor embodiments include at least one coating of photosensitive material, which can be formed on the photoreceptor by known techniques such as immersion or dip coating.

The peripheral ends of a coated photoreceptor are used to engage with flanges in a copier's drive mechanism and/or to support a developer housing. If the developer housing rides on the coated area at one end of the drum, the coating material is rubbed off and contaminates various components in the machine such as the cleaning system and any optical exposure systems employed in the machine. Also, the coating can interfere with devices that are designed to electrically ground the drum by merely riding on the outer surface at one end of the drum. Thus, both the outer and inner peripheral ends of a photoreceptor must be free of coating material.

Conventionally, the ends of a photoreceptor are masked before coating to prevent them from being coated. In dip coating, the upper end of the photoreceptor drum might be kept free of coating material by orienting the drum vertically and dipping the drum into a bath of coating material to a predetermined depth. However, the coating formed over the lower end of the photoreceptor must still be removed, usually by mechanically wiping the lower end and/or by applying solvents to it. Chemical treatments can cause solvent droplets or vapor to contact the coating in regions that are not intended to be removed, reducing the quality of the resulting photoreceptor. In addition, the initial cost of the solvent, and cost of solvent recovery can be very high. Moreover, where the coatings may contain different layers of different materials, different solvents may be required to remove different layers. This adds to the complexity of removal of photoconductive coatings with the aid of a solvent because each layer has to be separately treated with different solvent. Furthermore, organic solvents have a limited useful life and can be hazardous to work with. Mechanical techniques for removing coatings are cumbersome, inefficient, and often produce photoreceptors of unacceptable quality.

INFORMATION DISCLOSURE STATEMENT

Japanese Publication No. 3-144,458 discloses a process that attempts to remove coatings from the ends of a photoreceptor without mechanical or chemical treatment. A laser beam from an yttrium-aluminum-garnet laser is irradiated at the end portions of a photoreceptor drum to burn or sublimate the photoreceptor coating.

Japanese Publication No. 3-194,131 discloses a similar process in which laser energy is directed at the ends of a photoreceptor in an effort to completely remove the coating.

U.S. Pat. No. 4,877,644 to Wu et al., issued Oct. 31, 1989—A method for the selective plating of a metal substrate on which a thin polymeric resist is first applied, followed by the selective removal of the resist to expose portions of the substrate to plating, and plating. More particularly, the method includes the steps of selecting a laser wavelength which couples well to the metal substrate, choosing a polymer based plating resist having a low optical coefficient of absorption at the wavelength, curing the resist, subjecting selective areas of the resist to a single excimer laser shot, having a short wavelength, to cause ablative removal of the resist over selective areas of the substrate, and subjecting the exposed portions of the substrate to metal plating.

U.S. Pat. No. 4,671,848 to Miller et al., issued Jun. 9, 1987—a method for removing a dielectric coating from a conducting material is disclosed, wherein a high energy radiation source, such as a laser source, is focused in a region having a predefined relationship with the coating of the conducting material. The focused radiation results in a plasma or ionized region being formed. The coating in the vicinity of the plasma region is removed. The region of the focusing of the radiation is varied spatially to remove the dielectric coating in a pre-selected region of the conducting material. According to one embodiment, the radiation is focused in a region spatially removed from the conducting material in order that the direct radiation does not directly impact the conducting material.

U.S. Pat. No. 5,164,567 to Gettemy, issued Nov. 17, 1992—A method of cutting with a laser beam is disclosed where an oxygen-hydrocarbon reaction is used to provide auxiliary energy to a metal workpiece to supplement the energy supplied by the laser. Oxygen is supplied to the laser focus point on the workpiece by a nozzle through which the laser beam also passes.

LIFT-OFF STENCIL CREATED BY LASER ABLATION, IBM Technical Disclosure Bulletin, Vol. 28, No. 5, October 1985, page 2034—a system is disclosed for ablating polymeric materials to create holes, vias, or lift-off stencils having a finite taper.

In copending patent application Ser. No. 08/071,087, filed Jun. 4, 1993—a process is disclosed for treating a predetermined portion of a coating on a photoreceptor to remove at least part of the coating. The process involves directing a source of high energy irradiation at the coating in the presence of at least one fluid medium to remove at least part of the coating from the predetermined portion of the coating. The source of high energy irradiation is preferably a laser beam, ultrasonic energy, or a source of high intensity heat. The at least one fluid medium is preferably at least one gas jet, liquid jet or a liquid solvent.

Although laser treatment processes are intended to completely remove coatings, it has been found that many materials commonly used in photoreceptor coatings are melted, rather than vaporized, by these processes. The molten coating subsequently hardens and is removed as a dusty debris by associated fluid jets.

SUMMARY OF THE INVENTION

It is, therefore, an object of the present invention to provide an improved laser ablation system which overcomes the above-noted disadvantages.

It is yet another object of the present invention to provide an improved laser ablation system which prevents debris removed from an end of a photoreceptor drum from depositing on the photoreceptor imaging surfaces.

The foregoing objects and others are accomplished in accordance with this invention by providing The invention provides a system for removing a band of coating material from a first end of a coated cylinder having a second opposite end comprising ablating the band of coating material with a laser beam and directing an annular curtain of compressed fluid against the band in a direction away from the second opposite end to create a high velocity air curtain and resulting venturi like effect whereby ambient air is drawn along the outer surface of the cylinder in a direction from the second opposite end toward the band and the first end. More specifically, the system treats a predetermined portion of a coating on a cylindrical photoreceptor substrate to remove at least part of the coating adjacent a first end of the cylindrical photoreceptor substrate, comprising directing a source of high energy irradiation at the coating in the presence of at least four fluid mediums to remove at least part of the coating from a predetermined portion of the coating in the form of coating debris, a first of the fluid mediums being directed at the coating substantially parallel with the irradiation, a second of the fluid mediums exerting sufficient force on the molten coating to assist in the removal of the coating from the cylindrical photoreceptor substrate, and a third and fourth of the fluid mediums flowing as an annular fluid curtain in a direction toward the first end of the cylindrical photoreceptor substrate and away from the second end of the cylindrical photoreceptor substrate.

BRIEF DESCRIPTION OF THE DRAWINGS

Preferred embodiments of the invention will be described, by way of example, with reference to the accompanying drawings, in which.

DESCRIPTION OF PREFERRED EMBODIMENTS

The invention relates to a process for treating a coated photoreceptor having a first end and a second end to remove at least part of a predetermined portion of the coating adjacent the first end by directing a source of high energy irradiation at the coating in the presence of at least one fluid medium to remove at least part of the coating from the predetermined portion of the coating and directing an annular curtain of compressed fluid medium toward the predetermined portion of the coating in a direction away from the second end to create a venturi like effect whereby ambient air is drawn along the outer surface of the cylinder in a direction from the second opposite end toward the predetermined portion of the coating band at the first end. The source of high energy irradiation is preferably a laser beam. The fluid mediums are preferably at least a gas or a liquid. The annular curtain of compressed fluid medium assists in the removal of the coating material and prevents any of the removed coating material from depositing on the imaging regions of the coated photoreceptor.

A predetermined portion of a coating on a photoreceptor is treated to remove at least part of the coating by directing a laser beam and at least one fluid jet at the coating to remove at least part of the coating. This process will be referred to as "laser ablation." The laser ablation process functions to effectively remove at least part of a predetermined portion of a coating without the need for chemical or mechanical treatments. The process is useful for treating cylindrical photoreceptor drums.

Figure 1:
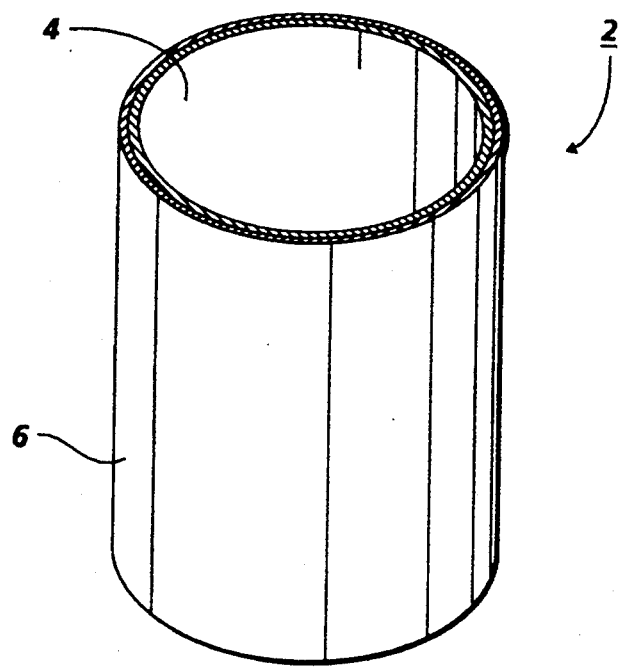
FIG. 1 shows a cylindrical photoreceptor having an outer coating to be treated according to the laser ablation embodiment of the invention.

For purposes of illustration, the process according to the invention will be described with reference to the treatment of a coated cylindrical photoreceptor. Referring to FIG. 1, a partially processed photoconductor drum 2 is shown. Drum 2 includes a rigid cylindrical substrate 4 having an outer coating 6 formed over the substrate. Substrate 4 can be made of any suitable material such as aluminum, nickel, zinc, chromium, conductive paper, stainless steel, cadmium, titanium, metal oxides, polyesters such as MYLAR®, and the like. Substrate 4 can be formed as one layer or as a plurality of layers, for example as a conductive layer coated over an insulating layer. The thickness of substrate 4 can vary widely depending on the intended use of the photoreceptor, and preferably is from about 65 micrometers to about 5 millimeters thick, most preferably from about 0.05 millimeter to about 2 millimeters thick.

The process removes various types of known photoreceptor coatings. Coating 6 can include one or a plurality of layers, and typically will include multiple layers such as an electrically conductive ground plane, a blocking layer, an adhesive layer, a charge generating (photogenerating) layer, a charge transporting layer and an overcoat layer. The process removes at least part of one coating layer. Preferably, all of the coating layers present at the outer and inner peripheral end regions of the photoreceptor are removed.

The layers of coating 6 are formed using well known techniques and materials. For example, coating 6 can be applied to substrate 4 by vacuum deposition, immersion, spray coating, or dip coating. Dip coating or spray coating are preferred. Suitable coating techniques and materials are illustrated in U.S. Pat. Nos. 5,091,278, 5,167,987 and 5,120,628, the entire disclosures of which are incorporated herein by reference. The process of the invention can be carried out in conjunction with the coating process, after the coating has partially hardened. Preferably, laser ablation is performed after the coating has substantially or fully hardened.

Coating 6 preferably includes, as a photoconductive material, one or a plurality of layers of selenium, metal alloys, and/or organic resins carrying photoconductive materials. Organic photoconductor coatings are preferred. Such coatings include a photoconductive material such as pigments including dibromoanthanthrone, metal-free and metal phthalocyanines, halogenated metal phthalocyanines, perylenes, and azo pigments, carried in a suitable organic binder resin. Examples of useful organic binder resins include polycarbonates, acrylate polymers, vinyl polymers, cellulose polymers, polysiloxanes, polyamides, polyurethanes, polyesters, and block, random or alternating copolymers thereof.

Figure 2:
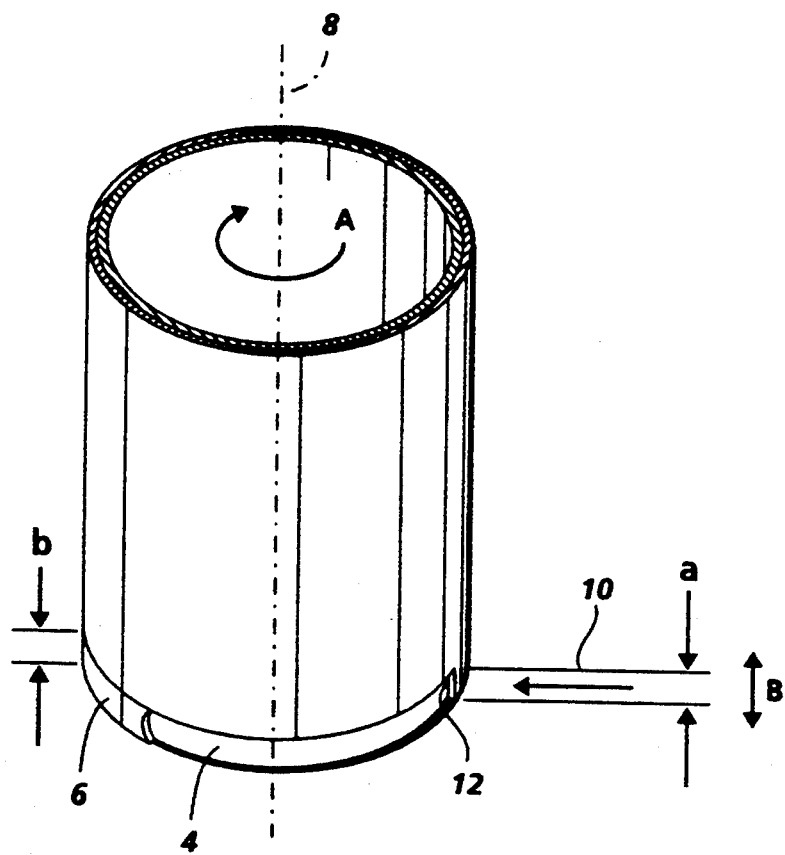
FIG. 2 illustrates the removal of a portion of the coating using laser irradiation according to the laser ablation embodiment of the present invention.

Referring to FIG. 2, drum 2 is mounted such that its axis 8 is vertically or horizontally oriented. Drum 2 is preferably mounted using a conventional chucking device coupled to a drive (not shown), so that drum 2 can be rotatably driven about axis 8 in the direction of arrow A. The photoreceptor is preferably rotated about axis 8 during the removal of the coating. A rotational speed of from about 400 rpm to about 4000 rpm is preferred.

As drum 2 is rotated, a laser beam 10 of width "a" from a conventional $CO_2$ laser (not shown) is directed at a predetermined portion of coating 6. The laser used in the process is preferably a continuous wave carbon dioxide laser. $CO_2$ lasers provide a laser beam having a wavelength that is particularly well absorbed by plastic binder resins commonly present in one or more layers of known photoreceptors. A $CO_2$ laser emitting a beam at a wavelength of about 10.6 micrometers has been found to work well for organic photoconductor films having polycarbonate binders. Carbon dioxide continuous wave lasers are commercially available and require no special modification to be effective in carrying out the ablation. Alternately, among others, a pulsed beam $CO_2$ laser, yttrium aluminum garnet (YAG) laser, or excimer laser could be used to carry out the laser ablation process.

The laser should have sufficient power to remove a desired amount of the particular coating to be treated. The power of the $CO_2$ laser should be selected depending on the type of substrate present in the photoreceptor. Where the photoreceptor includes an aluminum substrate, a laser having a power of from about 800 W to about 2000 W, more preferably from about 1000 W to about 1500 W, has been found to provide preferred results. With a nickel substrate, a laser having a power of from about 100 W to about 400 W is preferred.

The laser beam should have a sufficient watt density to ablate the photoreceptor coating. An optical system is preferably used to concentrate the laser beam and provide the required watt density for a particular photoreceptor coating. However, laser beam systems are available that may not require an optical system to provide a laser beam having a sufficient watt density to ablate a photoreceptor coating. The focal length, focus, and angle of incidence of the laser affect the laser ablation process, and can be selected depending on the particular coating and the results intended. A focal length of about 5 inches and a surface focus or slightly off-surface focus are preferred. Most preferably, the laser has a focus tolerance of about ±0.75 mm from the point of sharp focus, in either direction.

The predetermined portion of coating 6 to be treated has a desired width "b". To provide a suitable coating free area to support a developer housing or flange for a drive mechanism, width "b" is typically about 1 cm wide. The process could be used to ablate other widths of a photoreceptor coating. It may also be desirable to remove bands of the coating in one or more locations on the photoreceptor, or to remove circular or other shaped patterns of the coating.

Figure 6:
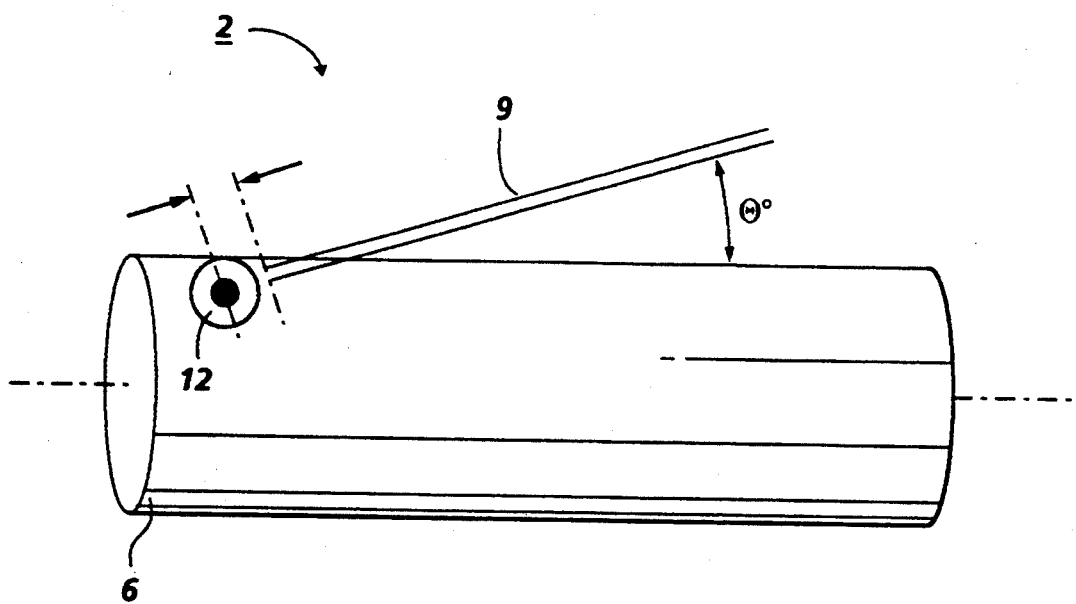
FIG. 6 shows a cross-jet for fluids.

At a given moment during laser ablation, laser beam 10 impinges on a spot 12 such that at least part of the coating material in the area of spot 12 is rapidly heated and vaporized by laser beam 10. Part of coating 6 is typically melted by laser beam 10; this molten coating material is forced off of drum 2 by the action of a cross-jet nozzle 9 (FIG. 6).

One fluid jet used in the ablation process is a cross-jet of fluid Another fluid jet used with the ablation process is coaxial with the laser beam. A combination of the two is preferred for laser ablation. Apparatus for supplying cross and coaxial fluid jets are commercially available and require no modification for purposes of the invention. The laser vaporizes and removes at least part of the coating. As discussed above, the laser will often melt but not vaporize certain other materials in the coating. By applying a high velocity stream of cross-jet fluid to the coating during laser treatment, the molten coating material is forced off the photoreceptor in a controlled manner. This permits all of the coating material to be removed from the predetermined region of the photoreceptor coating, without subsequent chemical or mechanical treatment. Cross-jet gas preferably has a pressure of from about 20 psi to about 400 psi, most preferably from about 100 psi to about 300 psi.

The supplying of a coaxial fluid jet around the laser beam during laser treatment prevents debris from backing up into the laser during the ablation process. The coaxial fluid jet travels around the outside of the laser beam in the same direction as the beam. This protects the laser and increases the online production time of the laser ablation system. A coaxial gas jet preferably has a pressure in the range of from about 5 psi to about 150 psi, more preferably from about 20 psi to about 60 psi, measured near the point at which the gas exits from the jet nozzle. It will be understood that the pressure of the gas can be varied by controlling the nozzle orifice size and the speed of the gas exiting the gas jet nozzle. A suitable nozzle diameter is about 1.5 mm, but various diameters are useful. Preferably, the process uses both cross and coaxial gas jets.

The gas used in the cross-jet and/or coaxial jet is preferably air, but can be other gases such as nitrogen gas or pure oxygen gas, depending on the coating material and other laser ablation conditions. For example, if a highly reactive or potentially explosive coating is to be removed, an inert cross-jet or coaxial jet gas such as nitrogen gas can be used. Conversely, if additional oxidation of the coating during the laser ablation process is desired, pure oxygen gas or other reactive gas mixtures can be used.

In an alternative embodiment, a liquid cross jet could be used to assist the removal of the ablated photoreceptor coating. The liquid jet should have an orientation and pressure sufficient to impart about the same pressure on the ablated coating as the cross jet gas described above.

As drum 2 rotates during the laser ablation process, a circumferential strip of coating material 6 substantially the same width as the width "a" of the laser beam is removed, exposing the underlying cylindrical photoreceptor substrate 4. The laser and gas jets are directed at the predetermined portion of coating 6 until the intended amount of coating has been removed.

The laser beam can have a width equal to the predetermined portion to be treated, or it can be narrower, in which case the laser beam is preferably translated across the width of the predetermined portion of the coating during the rotation of the photoreceptor. In a preferred embodiment, the width "a" of laser beam 10 is less than the width "b" of the predetermined portion of coating 6 to be treated. The laser source is mounted on a carriage (not shown) so as to be reciprocatable parallel to axis 8 during rotation of drum 2. To ablate the coating, as drum 2 rotates, laser beam 10 and the coaxial and cross-jet fluids are impinged on the inboard edge of the circumferential strip and then translated toward the bottom edge of photoreceptor drum 2, so as to cover the width "b" of the predetermined portion of coating 6. Alternately, laser beam 10 and the fluid jets can be translated from the outer edge of drum 2 toward the inboard edge of the circumferential strip. Preferably, laser ablation begins at the inboard edge of the predetermined portion of the coating to be removed, and the laser beam is translated toward the end of the photoreceptor. The coaxial fluid jet, if used, moves with the laser beam as the beam is translated over the photoreceptor coating. The cross-jet of fluid, if used, can be moved with the laser beam, or it can be maintained in a stationary position. The fluid jets are preferably directed at the photoreceptor to push the ablated coating off the end of the photoreceptor during the treatment. This helps prevent the ablated coating material from resettling on the untreated portion of the coating. A suction exhaust system (not shown) is preferably used to help capture the particulate debris and remove it from the treatment area. The fluid stream from the cross-jet nozzle and the fluid stream introduced coaxially with the laser beam collide with each other and with the surface of the photoreceptor to create turbulence which can carry some of the particles of ablated coating material removed from the drum onto areas of the photoreceptor coating that is to subsequently be used for electrophotographic imaging. The coating debris which settles on the imaging regions of the photoreceptor causes defects in final xerographic images formed during the electrophotographic imaging process. Thus, an additional cleaning operation is employed to remove the debris. Moreover, the deposited debris is very difficult to remove from the imaging surface without damaging the delicate surface. Also, fine particles of debris tend to tenaciously adhere to the imaging surface and an additional cleaning operation does not always effectively remove all of the deposited debris.

The translation speed of laser beam 10 preferably is from about 0.25 millimeter per second to about 12.5 millimeters per second. A single pass over the coating is preferred. Laser beam 10 can be translated across the width "b" of the predetermined portion of coating 6 more than once if needed to remove coating material not removed by the first pass of the laser beam.

Optionally, if laser beam 10 has a width "a" less than the width "b" of the circumferential strip, laser beam 10 can be rapidly oscillated up and down in the directions of arrow B to cover the desired width "b" of coating 6 with the laser beam at spot 12.

Figure 3:
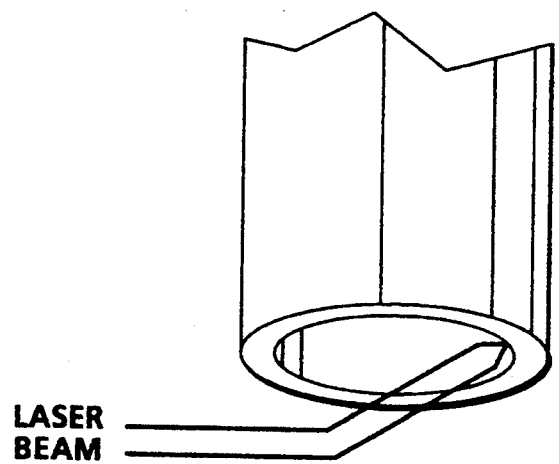
FIG. 3 is a partial plan view showing the removal of a coating from an inner portion of a cylindrical photoreceptor according to the laser ablation embodiment of the invention.

When the desired amount of coating 6 has been removed from the outer predetermined surface(s) of drum 2, the laser and fluid jets can be stopped and reoriented to impinge upon any selected inner surface(s) of drum 2. In the case of a cylindrical photoreceptor, the outer and inner peripheral surfaces of the photoreceptor are preferably treated to remove the coating from the photoreceptor. FIG. 3 is a partial plan view showing the removal of a coating from an inner portion of a cylindrical photoreceptor according to the laser ablation embodiment of the invention. Once the inner and/or outer predetermined portions have been treated, the process is stopped and drum 2 is removed from the chucking device for further processing or use.

Figure 4:
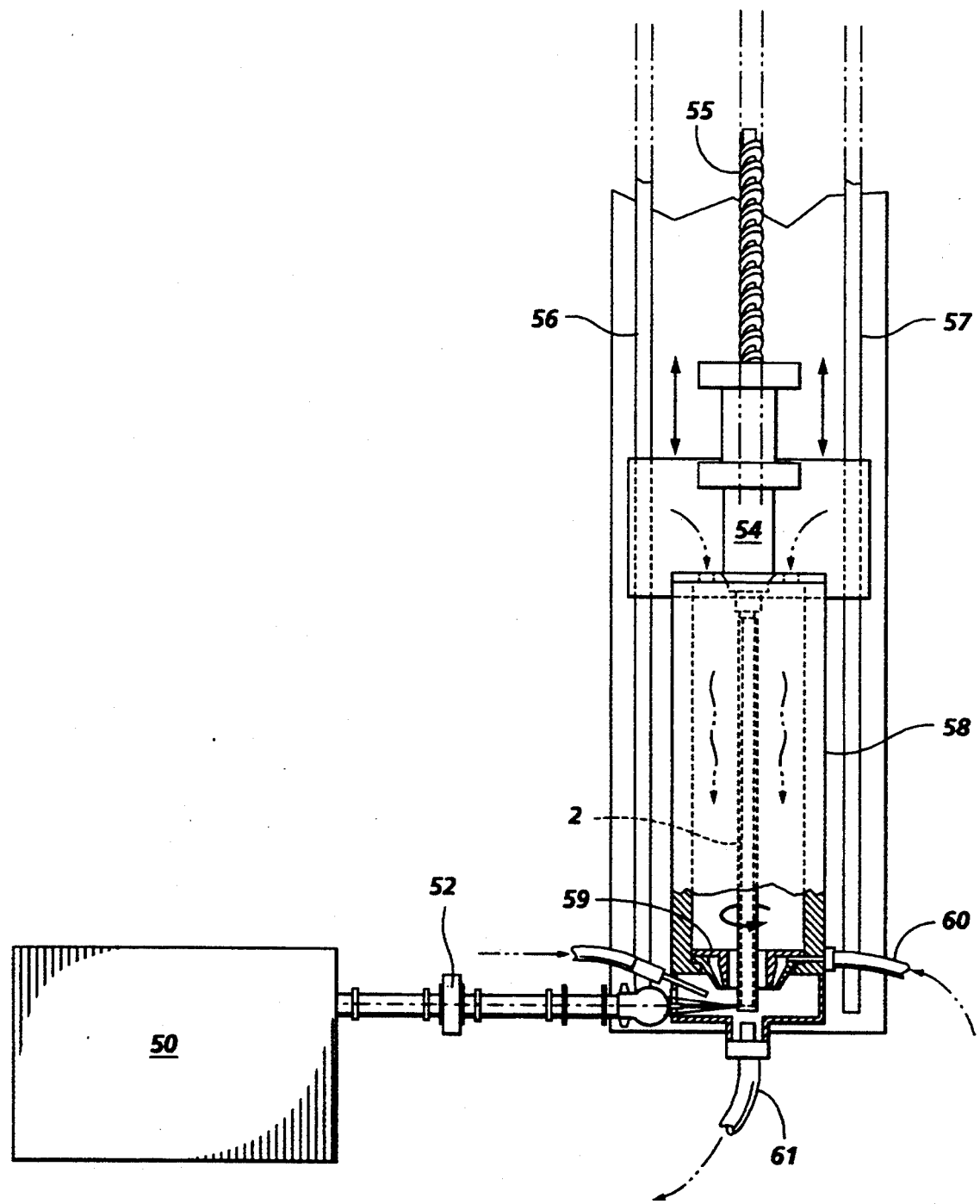
FIG. 4 is a plan view of a laser system for removing a coating from a photoreceptor using laser ablation and an annular fluid ring.

FIG. 4 is a plan view of a suitable laser system for removing a coating from a photoreceptor according to a laser ablation system of the invention. Referring to FIG. 4, the apparatus includes a laser section 50 including a $CO_2$ continuous wave laser, an optical train 52 for directing and concentrating the laser beam, and a material handling section 54 for supporting and rotating photoreceptor drum 2. A lead screw 55 is employed to reciprocate material handling section 54 on support rails 56 and 57 into and out of housing 58. Housing 58 has an annular nozzle 59 coaxially aligned with photoreceptor drum 2. Annular nozzle 59 is adapted to direct an annular compressed fluid curtain toward the outer predetermined surface of photoreceptor drum 2 to form a high velocity protective curtain and carry ablated debris away from the untreated end of photoreceptor drum 2. Compressed fluid such as air is fed to annular nozzle 59 through inlet 60. A suction exhaust system 61 is preferably used to help capture the particulate debris and remove it from the treatment area.

Figure 5:
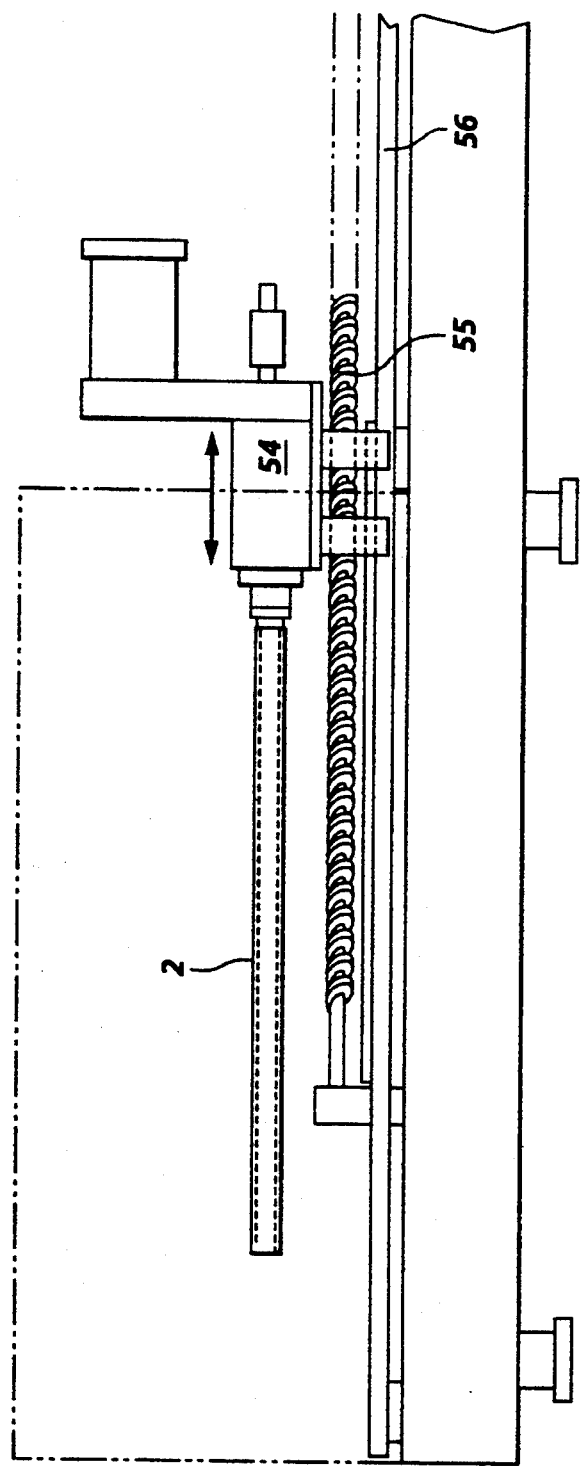
FIG. 5 is a side view of the reciprocationg material handling system.

FIG. 5 is a side view of the reciprocating material handling system.

FIG. 6 shows a side view of drum 2 being laser ablated at spot 12 on coating 6. Cross-jet fluid nozzle 9 directs a high velocity fluid at spot 12 to force molten coating material off the end of drum 2. As shown, nozzle 9 is preferably oriented at an angle 0° from the outer surface of coating 6. The angle $\theta$ of orientation of cross-jet fluid nozzle 9 is preferably from about 0° to about 90° from the surface of coating 6, most preferably from about 15° to about 45°. The cross-jet fluid also has a second angle associated with it, measured from the line of action of the laser beam. This angle is preferably from about 15° to about 60°, most preferably from about 30° to about 45°.

Figure 7:
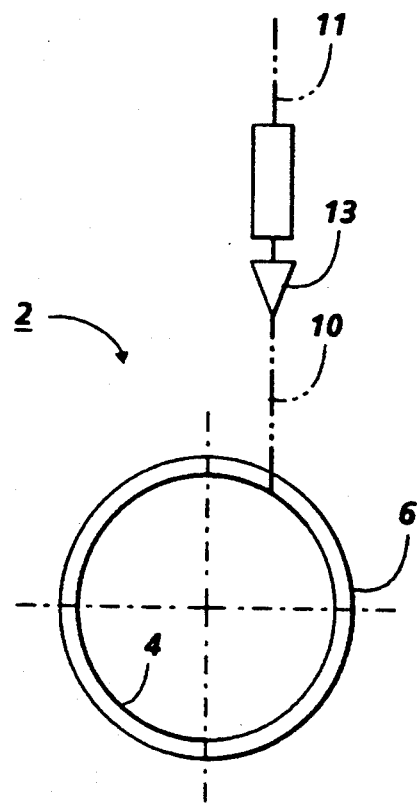
FIG. 7 illustrates a preferred orientation of laser ablation.

FIG. 7 illustrates a preferred laser orientation. Laser beam nozzle 13 is preferably oriented along axis 11 which is coincident with beam 10 such that laser beam 10 intersects both coating 6 and substrate 4. The laser beam can be directed at the coating at various angles to provide an adequate absorption of the laser energy by coating 6. Absorption of the laser energy by substrate 4 should be minimized. Also, the laser beam should not be directed along a diameter of photoreceptor 2 because this may cause the laser beam to reflect off of substrate 4 directly back into the laser, possibly damaging the laser.

Figure 8:
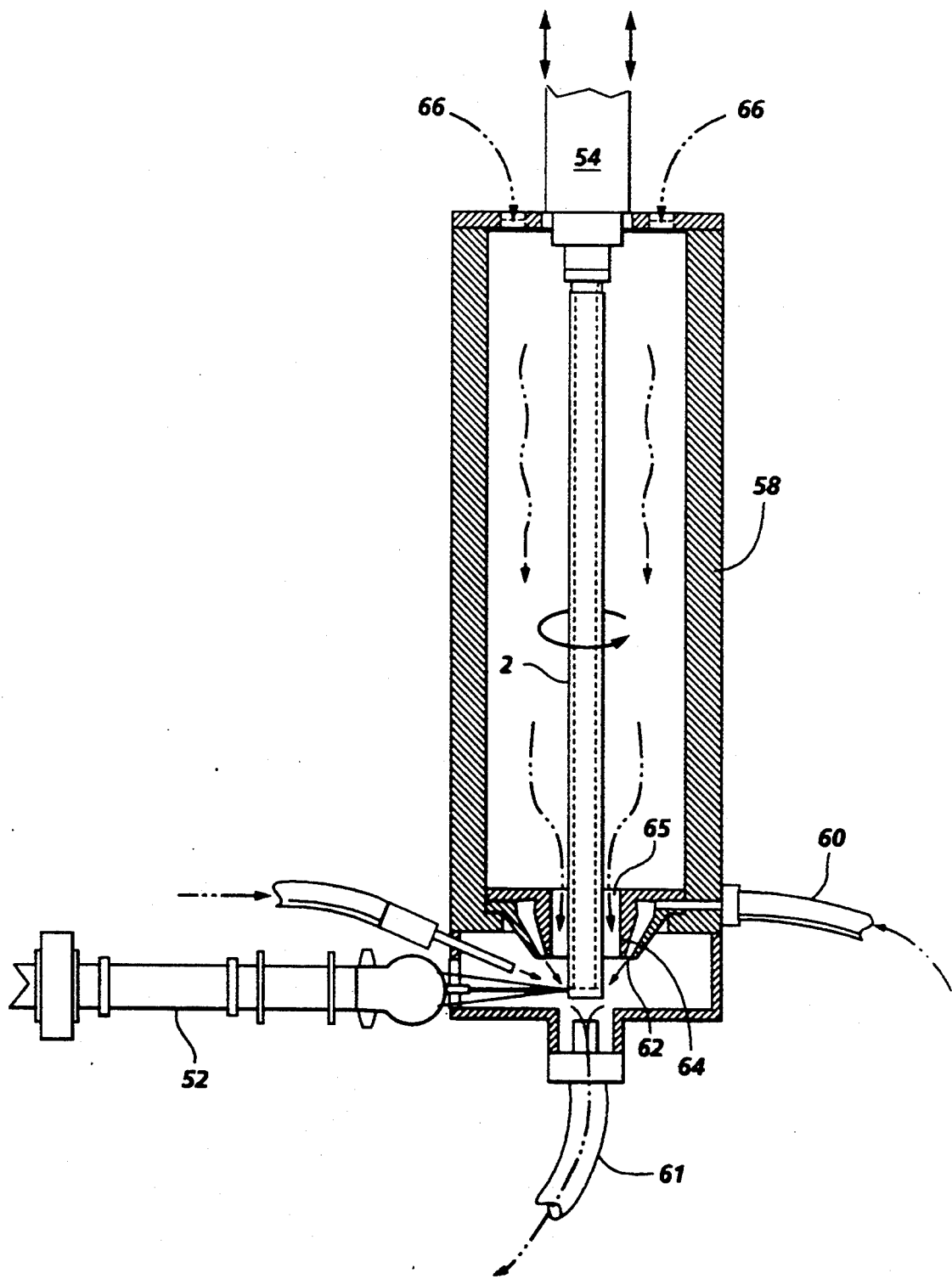
FIG. 8 shows an expanded view of apparatus for removing a photoreceptor coating.

FIG. 8 shows a partial expanded view of FIG. 4 with more details shown. Referring to FIG. 8, the apparatus includes a laser section 50 including a $CO_2$ continuous wave laser, an optical train 52 for directing and concentrating the laser beam, and a material handling section 54 for supporting and rotating photoreceptor 2. Material handling section 54 is reciprocated into and out of housing 58. Housing 58 has an annular nozzle 59 coaxially aligned with photoreceptor drum 2. Annular nozzle 59 is adapted to direct an annular compressed fluid curtain through a slot 62 toward the outer predetermined surface of drum 2. Compressed fluid such as air is fed to annular nozzle 59 through inlet 60 at a high pressure. Any suitable high pressure may be utilized to form the annular air curtain. Typical pressures are between about 7 kilograms/cm$^2$ and about 63 kilograms/cm$^2$. Pressures between about 28 kilograms/cm$^2$ and about 56 kilograms/cm$^2$ are preferred. An air velocity for the curtain as it escapes from the outlet of the nozzle is preferably between about 100 meters/second and about 250 meters/second to ensure that sufficient velocity is achieved to overcome any detrimental components of turbulence from the cross jet. Slot 62 is positioned to impinge an annular compressed fluid curtain against drum 2 at an angle between about 10 degrees and about 80 degrees, and preferrably between 30 and 60 degrees, the angle being measured between an imaginary centerline of slot 62 or the high velocity annular air curtain stream emanating therefrom and an imaginary axis of photoreceptor drum 2. Generally, the distance between the slot opening of slot 62 and the outer surface of photoreceptor drum 2 is between about 1 millimeter and about 20 millimeters. A distance between about 3 millimeters and about 8 millimeters is preferred. Optimum results have been achieved with a nozzle to the surface being cleaned distance of about 5 millimeters. The gas being utilized should be filtered prior to use in order to remove undesirable particles. The surface 64 of annular nozzle 59 facing drum 2 adjacent may be parallel to and concentric with drum 2 to form an annular passageway 65. The movement of the annular compressed fluid curtain from slot 62 toward suction exhaust system 61 creates a venturi effect which draws ambient air through a ring filter 66 into housing 58, through passageway 65 and into suction exhaust system 61. Such movement of the ambient air and annular compressed fluid curtain toward suction exhaust system 61 captures all the particulate debris and transports it from the treatment area to suction exhaust system 61 thereby preventing any debris from accidentally depositing on the areas of the drum 2 that are to subsequently be used for imaging. The expression "venturi like effect" as employed here in is defined as the inducement of added fluid flow caused by the velocity and direction of the annular nozzle discharge. The slot gap for the slot opening for annular nozzle 59 is preferably between about 0.025 millimeters and about 0.25 millimeter to provide sufficient fluid flow to create a venturi effect. The specific slot opening size selected will depend upon the specific angle employed for the annular compressed fluid curtain against drum 2. Passageway 65 preferably has a gap of between about 1 millimeter and about 6 millimeters to ensure positive movement of ambient air from ring filter 66 into housing 58, through passageway 65 and into suction exhaust system 61. Although the creation of a venturi effect to draw ambient air through a ring filter 66 into housing 58, through passageway 65 and into suction exhaust system 61 is preferred, satisfactory results may be achieved with ring filter 66 plugged (not shown) or passageway 65 closed (not shown) to prevent flow of ambient air into housing 58 or through passageway 65. In other words, satisfactory results may be attained with only three fluid streams to remove the coating and coating debris, i.e. the first fluid stream being directed at the coating substantially parallel with the laser irradiation, a second fluid stream exerting sufficient force on the coating to assist in the removal of the coating from drum 2, and a third fluid stream flowing as an annular compressed fluid curtain from annular nozzle 59 in a direction toward the coating material being removed from drum 2.

Figure 9:
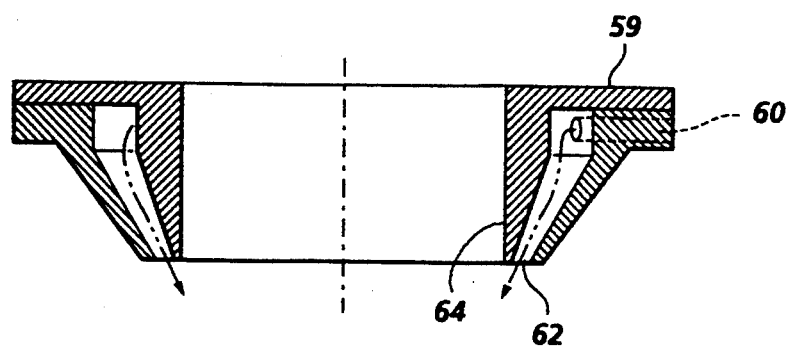
FIG. 9 illustrates an expanded cross sectional view of an annular fluid ring.

FIG. 9 illustrates an enlarged cross sectional view of annular nozzle 59.

Figure 10:
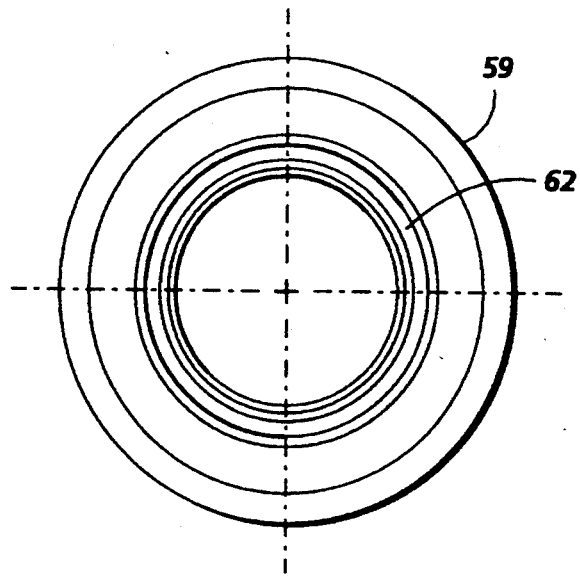
FIG. 10 shows an expanded view of one embodiment of nozzle openings for the annular fluid ring.
Figure 11:
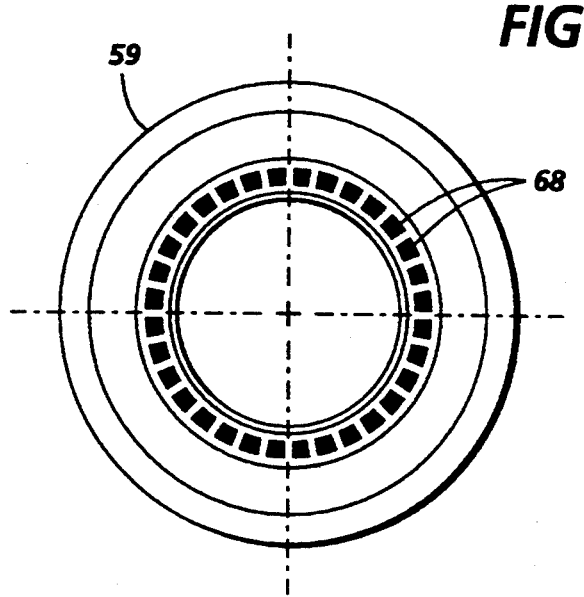
FIG. 11 illustrates an expanded view of another embodiment of nozzle openings for the annular fluid ring.
Figure 12:
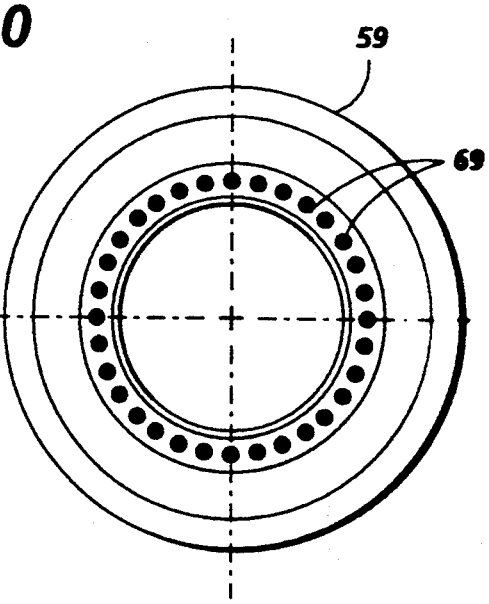
FIG. 12 shows an expanded view of of still another embodiment of nozzle openings for the annular fluid ring.

FIG. 10 shows an embodiment of nozzle 59 which utilizes a continuous slot 62. Although slot of nozzle 59 may be a continuous, it may alternatively comprise a plurality of apertures. The apertures may have any suitable shape. Typical shapes include circles, ovals, squares, rectangles and the like. FIG. 11 illustrates an embodiment of nozzle 59 which utilizes a plurality of slots 68 having a rectangular cross section. FIG. 12 shows an embodiment of nozzle 59 which utilizes a plurality of slots 69 having a circular cross section.

Figure 13:
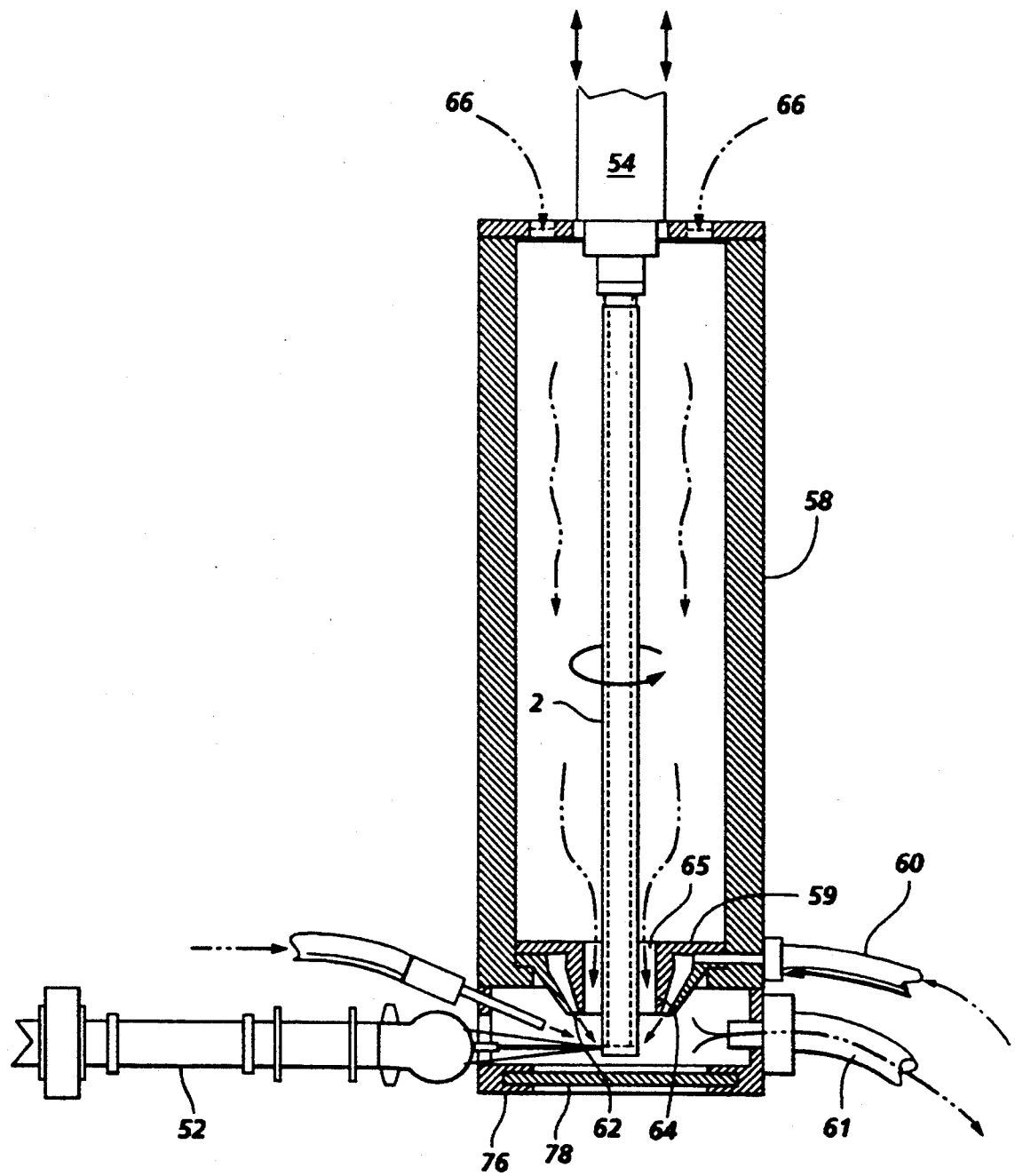
FIG. 13 illustrates an embodiment which differs from the embodiment shown in FIG. 8.

FIG. 13 illustrates an embodiment which differs from the embodiment shown in FIG. 8 in that a slotted frame 76 is provided for a sliding door 78. Sliding door 78 may be slid partially or completely out of slotted frame 76 to allow photoreceptor 2 to be inserted into or removed from housing 58. Alternatively, slotted frame 76 and sliding door 78 may be substituted with any other suitable means to allow insertion or removal of photoreceptor 2. For example, a door which is hinged on one side to pivot out of the way (not shown) may be utilized.

The laser ablation process removes all or a portion of the coating layers as well as materials contained within the ablated coating, such as pigments, adhesives, solvents, binders, conductive particles of metal oxides, and the like. The process obviates the need to further treat drum 2 with chemical solvents or mechanical coating removal means.

EXAMPLES 1–9

Laser Ablation of Photoreceptor Coating

Several photoreceptors are prepared by coating cylindrical substrates. A base coating layer is formed using isopropyl alcohol and butanol solvents, and a randomized copolymer. A middle coating layer is formed using a binder resin and dibromoanthanthrone pigment. A top coating layer is formed using a chlorobenzene solvent, a polycarbonate binder resin and a diamine transport molecule.

The photoreceptors are treated according to the process of the invention. A continuous wave $CO_2$ laser is used. The laser provides a laser beam having a diameter of 0.0058 inches after focusing. The laser's focus latitude is about ±0.75 mm from the point of sharp focus. The photoreceptors are mounted in a chucking device, rotated, and the laser beam is impinged on a peripheral end of each of the photoreceptors to remove different widths of coatings. An annular gas stream is impinged on the substrate at an angle of 45 degrees thereby creating a outward flow of filtered air through the surrounding enclosure. Treatment conditions are varied as follow:

| Example | Laser Power (W) | Spindle Speed (rpm) | Traverse Speed (ipm) | Coax Gas (psi) | X-Jet Gas (psi) | Time (sec) | Annular Nozzle Gas (Psi) |
|---|---|---|---|---|---|---|---|
| 1 | 1500 | 4000 | 5.5 | 100 | 300 | 4 | 800 |

-continued

| Example | Laser Power (W) | Spindle Speed (rpm) | Traverse Speed (ipm) | Coax Gas (psi) | X-Jet Gas (psi) | Time (sec) | Annular Nozzle Gas (Psi) |
|---|---|---|---|---|---|---|---|
| 2 | 1500 | 4000 | 3.88 | 100 | 300 | 6 | 600 |
| 3 | 1700 | 4000 | 5.5 | 60 | 300 | 4 | 700 |
| 4 | 1700 | 4000 | 11 | 60 | 300 | 2 | 600 |
| 5 | 1700 | 4000 | 22 | 100 | 300 | 1 | 500 |
| 6 | 1500 | 2000 | 5.5 | 100 | 300 | 4 | 500 |
| 7 | 1900 | 4000 | 5.5 | 100 | 300 | 4 | 500 |
| 8 | 1900 | 2000 | 22 | 100 | 200 | 1 | 400 |
| 9 | 1500 | 4000 | 8.5 | 80 | 200 | 3 | 400 |

The treatments result in a satisfactory removal of all of the coating layers from a peripheral end of the photoreceptor. In addition debris is prevented from redepositing on the imaging area. Most of the photoreceptors do not require further treatment, as all of the coating in the treated region is removed by a single pass of the laser beam. A partial or complete second pass with the laser beam can be carried out to remove any residual coating material left behind by the first pass of the laser beam. The translation speed of the laser beam can be slowed down on the second pass if greater laser energy is needed to remove the residual coating material.

The invention thus provides a process for successfully removing at least part and preferably all of the coating layers at selected areas such as the inner and/or outer peripheral ends of a photoreceptor. The laser ablation and heat processes eliminate the need to chemically or mechanically treat an ablated photoreceptor coating. The invention eliminates the need for masking of the photoreceptor ends during the coating process. In dip coating processes, the invention eliminates the conventional bottom edge wipe step. The process simplifies the manufacture of photoreceptors, facilitates automation, produces higher product yields, and requires few moving mechanical parts. The invention minimizes the rate of solvent usage and the amount of solvent waste.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A process for treating a predetermined portion of a coating on a cylindrical photoreceptor substrate to remove at least part of said coating adjacent a first end of said cylindrical photoreceptor substrate, comprising directing a source of high energy irradiation at said coating in the presence of at least four fluid mediums to remove at least part of said coating from a predetermined portion of said coating in the form of coating debris, a first of said fluid mediums being directed at said coating substantially parallel with said irradiation, a second of said fluid mediums exerting sufficient force on said coating to assist in the removal of said coating from said cylindrical photoreceptor substrate, and a third and fourth of said fluid mediums flowing as an annular compressed fluid curtain in a direction toward said first end of said cylindrical photoreceptor substrate and away from a second end of said cylindrical photoreceptor substrate.

2. A process according to claim 1 wherein said third of said fluid mediums is impinged as a high velocity annular compressed air curtain stream against said coating at an angle sufficient to create a venturi like effect to draw said fourth of said fluid mediums toward said first end of said cylindrical photoreceptor substrate and away from said second end of said cylindrical photoreceptor substrate.

3. A process according to claim 2 wherein venturi like effect created by said high velocity annular compressed air curtain stream draws said fourth of said fluid mediums through an air filter and across said coating toward said first end of said cylindrical photoreceptor substrate and away from said second end of said cylindrical photoreceptor substrate.

4. A process according to claim 2 wherein said third of said fluid mediums is impinged against said coating at an angle between about 10 degrees and about 80 degrees, said angle being measured between an imaginary centerline of said high velocity annular air curtain stream and an imaginary axis of said cylindrical photoreceptor substrate.

5. A process according to claim 4 wherein said third of said fluid mediums is impinged against said coating at an angle between about 30 degrees and about 60 degrees relative to an imaginary axis of said cylindrical photoreceptor substrate.

6. A process according to claim 2 wherein said third of said fluid mediums has a pressure of from about 7 kilograms/cm$^2$ to about 63 kilograms/cm$^2$.

7. A process according to claim 1 including exhausting said at least four fluid mediums and said coating debris away from said first end of said cylindrical photoreceptor substrate.

8. A process according to claim 1 wherein said source of high energy irradiation is a laser beam.

9. A process according to claim 8 wherein said first of said fluid mediums travels coaxially with and in the direction of travel of said laser beam.

10. A process according to claim 9 wherein said first of said fluid mediums has a pressure of from about 5 psi to about 150 psi.

11. A process according to claim 10 wherein said second of said fluid mediums has a pressure of from about 20 psi to about 400 psi.

12. A process according to claim 1 wherein said second of said fluid mediums is a cross-jet of gas.

13. A process according to claim 8 wherein said cylindrical photoreceptor substrate is rotated about an axis perpendicular to said laser beam during the removal of said coating.

14. A process according to claim 13 wherein the width of said laser beam is less than the width of a predetermined portion of said coating and said laser beam is translated over the width of said predetermined portion of said coating to remove at least part of said coating.

15. A process according to claim 8 wherein said laser beam is provided by a continuous wave carbon dioxide laser.

16. A process according to claim 8 wherein said laser has sufficient power to ablate said predetermined portion of said coating.

17. A process according to claim 1, wherein said coating comprises an organic photoconductor coating.

18. A process for removing a band of coating material from a first end of a coated cylinder having a second opposite end comprising ablating said band of coating material with a laser beam and directing an annular curtain of compressed fluid against said band in a direction away from said second opposite end to create an air curtain along the outer surface of said cylinder in a direction from said second opposite end toward said band and said first end.

19. Apparatus for removing a circumferential band of coating material from at least one end of a coated cylinder comprising means to support said coated cylinder, means for directing a laser beam on said coating material at said end of said coated cylinder, means to rotate a segment of said coated cylinder in said laser beam to ablate away ring of said coating material in said segment, means to incrementally advance said cylinder in an axial direction until said ring of ablated away coating becomes a circumferential band, an annular nozzle coaxial with said coated cylinder to supply a high pressure annular curtain of compressed fluid at an angle to said coated cylinder, and means to collect said ablated away coating and transport it away from said end of said cylinder.

20. Apparatus according to claim 19 wherein said annular nozzle is coaxial with and spaced from said coated cylinder whereby said high pressure annular curtain of compressed fluid supplied by said nozzle creates a venturi like effect sufficient to draw ambient air along said coated cylinder toward said end of said cylinder to carry away said ablated away coating in a direction away from said end of said cylinder.

* * * * *